United States Patent [19]

Grasso et al.

[11] Patent Number: 5,198,000

[45] Date of Patent: Mar. 30, 1993

[54] METHOD AND APPARATUS FOR REMOVING GAS PHASE ORGANIC CONTAMINANTS

[75] Inventors: Domenic Grasso, Dayville; George E. Hoag, Storrs, both of Conn.

[73] Assignee: The University of Connecticut, Storrs, Conn.

[21] Appl. No.: 723,484

[22] Filed: Jul. 1, 1991

Related U.S. Application Data

[63] Continuation-in-part of Ser. No. 579,893, Sep. 10, 1990, abandoned.

[51] Int. Cl.[5] ............................................. B01D 53/14
[52] U.S. Cl. .......................................... 55/20; 55/37; 210/644
[58] Field of Search ................... 210/648, 649; 55/84, 55/85, 37, 20, 21

[56] References Cited

U.S. PATENT DOCUMENTS

| | | | |
|---|---|---|---|
| 3,660,045 | 5/1972 | Gladu | 23/277 C |
| 3,926,744 | 12/1975 | Noll et al. | 203/55 |
| 4,353,715 | 10/1982 | Mir et al. | 55/22 |
| 4,378,235 | 2/1983 | Cosper et al. | 55/85 |
| 4,426,210 | 1/1984 | Drawert et al. | 55/73 |
| 4,528,001 | 7/1985 | Yokogawa et al. | 55/37 |
| 4,844,721 | 7/1989 | Cox et al. | 55/85 |

FOREIGN PATENT DOCUMENTS

| | | |
|---|---|---|
| 0073171 | 3/1983 | European Pat. Off. . |
| 5046562 | 4/1975 | Japan . |
| 5194489 | 8/1976 | Japan . |
| 144515 | 12/1978 | Japan . |
| 153725 | 9/1982 | Japan . |
| 1139482 | 2/1985 | U.S.S.R. . |
| 548908 | 10/1942 | United Kingdom . |

OTHER PUBLICATIONS

Handbook of Chemistry, Lange pub. by Handbook Publishers, Inc. pp. 738-745, 1952.
Kirk-Othmer Ency. of Chem. Tech. p. 460.
McGraw-Hill Ency. of Science & Tech. 1971 ed.

Primary Examiner—Frank Spear
Attorney, Agent, or Firm—Fishman, Dionne & Cantor

[57] ABSTRACT

A method for removing volatile organic compounds from a contaminated gas stream includes contacting the contaminated gas stream with a nonvolatile organic liquid absorbent under conditions effective to allow absorption of the volatile organic compound from the gas stream into the absorbent and separation of the absorbed volatile organic compound from the absorbent to provide recycled absorbent and a reclaimed volatile organic compound. An apparatus for removing volatile organic compounds from a contaminated air stream includes means for contacting the contaminated air stream with an absorbent to allow absorption of the volatile organic compound by the absorbent and means for separating the absorbed volatile organic compound from the absorbent.

13 Claims, 7 Drawing Sheets

METHOD AND APPARATUS FOR REMOVING GAS PHASE ORGANIC CONTAMINANTS

This is a continuation-in-part of U.S. application Ser. No. 579,893, filed Sep. 10, 1990, now abandoned, by D. Grosso and G. Hoag.

FIELD OF THE INVENTION

The present invention relates to a method and apparatus for removing volatile compounds from a contaminated gas stream.

BACKGROUND OF THE INVENTION

Contamination of both the saturated and unsaturated zones of the subsurface with volatile organic compounds (VOCs) is ubiquitous. The potential adverse health effects and other environmental implications of VOC contaminated subsurface systems has made remediation of these sites a major focus of environmental concern. At present, the most popular techniques for remediation of these contaminated sites is the application of physical mass transfer and concentration processes, e.g. vapor extraction of contaminated soil and gas stripping of contaminated ground water For example, U.S. Pat. No. 4,544,488 (O'Brien) is directed to gas stripping of contaminated ground water. O'Brien describes injecting VOC contaminated water and noncontaminated water into an induced draft air stripper through spray nozzles to strip the volatile organic contaminants from the water into the air stream. The VOC contaminated air stream is vented to the atmosphere and the effluent water stream is passed through a carbon adsorption bed for removal of nonvolatile organic contaminants An unfortunate consequence of the vapor extraction and gas stripping treatment processes is the transfer of the volatile organic compounds from one medium to another, i.e. in many cases the off-gases of these processes is simply vented to the atmosphere without further treatment.

In addition, many manufacturing, fuel transfer and combustion processes discharge VOCs directly to the atmosphere. In many cases, discharges of VOCs to the atmosphere simply go untreated. Treatment of VOC contaminated gas streams, when applied, typically takes the form of a cost intensive nonrecoverable process such as an activated carbon adsorption process or a combustion Process. For example, U.S. Pat. Nos. 4,540,579 (Cunningham) and 4,343,096 (Berglund) are each directed to combustion processes for treating VOC contaminated gas streams. However, the high cost of combustion processes limits the applicability of combustion technology as a routine treatment for VOC contaminated gas streams.

The application of known off-gas treatment techniques to the removal of VOCs from a gas stream frequently proves economically and/or practically infeasible Activated carbon adsorption as described in "Using GAC To Remove VOCs From Air Stripper Off-Gas" J.C. Crittendent et al, J. American Water Works Association, 80:5:73, 1988 is a known off-gas treatment. However, the expense of online adsorption as well as the poor removal efficiencies for certain common VOC contaminants, e.g. methyl chloride and 1,1,1,-trichloroethane, limit the practical applicability of adsorption technology as routine treatment process for VOC contaminated gas streams.

Each of the above discussed treatment methods approach the problem of VOC contamination from a very limited perspective, i.e. treatment of a VOC contaminated medium regarded as a disposal problem, rather than as a potential source of a renewable resource.

SUMMARY OF THE INVENTION

Accordingly, it is an objective of the present invention to provide an off-gas treatment process that offers an economical and environmentally benign solution to the remediation of gas streams that are contaminated with volatile organic compounds.

Another objective is to provide an off-gas treatment process that is highly efficient in removing substantially all VOC contaminants.

Another objective is to provide an off-gas treatment that taps the potential for a renewable resources by allowing the reclaimation of VOCs from contaminated gas streams.

These and still further objectives will become apparent hereinafter.

The foregoing objectives are achieved in a method for separating a volatile organic compound from a contaminated gas stream which includes the steps of contacting the contaminated gas stream with a nonvolatile organic liquid absorbent, said volatile organic compound being soluble in said absorbent, under conditions effective to allow absorption of the volatile organic compound from the gas stream into the absorbent, thereby providing a reduced contaminant gas stream and a contaminated absorbent. The absorbed volatile organic compound is then separated from the contaminated absorbent to provide a recovered contaminant concentrate and a recyclable absorbent.

A method for remediation of a subsurface zone is also disclosed. The remediation method includes the steps of transferring a volatile organic compound from the subsurface zone into a gas stream, e.g., by stripping of contaminated groundwater or vapor extraction of contaminated soil, contacting the contaminated gas stream so formed with the above described nonvolatile organic liquid absorbent and separating the absorbed volatile organic compound from the absorbent to reclaim the volatile organic compound.

An apparatus for separating a volatile organic compound from a contaminated gas stream is also disclosed. The apparatus includes means for contacting the contaminated gas stream with a nonvolatile organic liquid absorbent, said compound being soluble in the absorbent, to provide a reduced contaminant gas stream and a contaminated absorbent, and means for separating absorbed volatile organic compound from the contaminated absorbent.

DETAILED DESCRIPTION OF THE INVENTION

Figure 1:
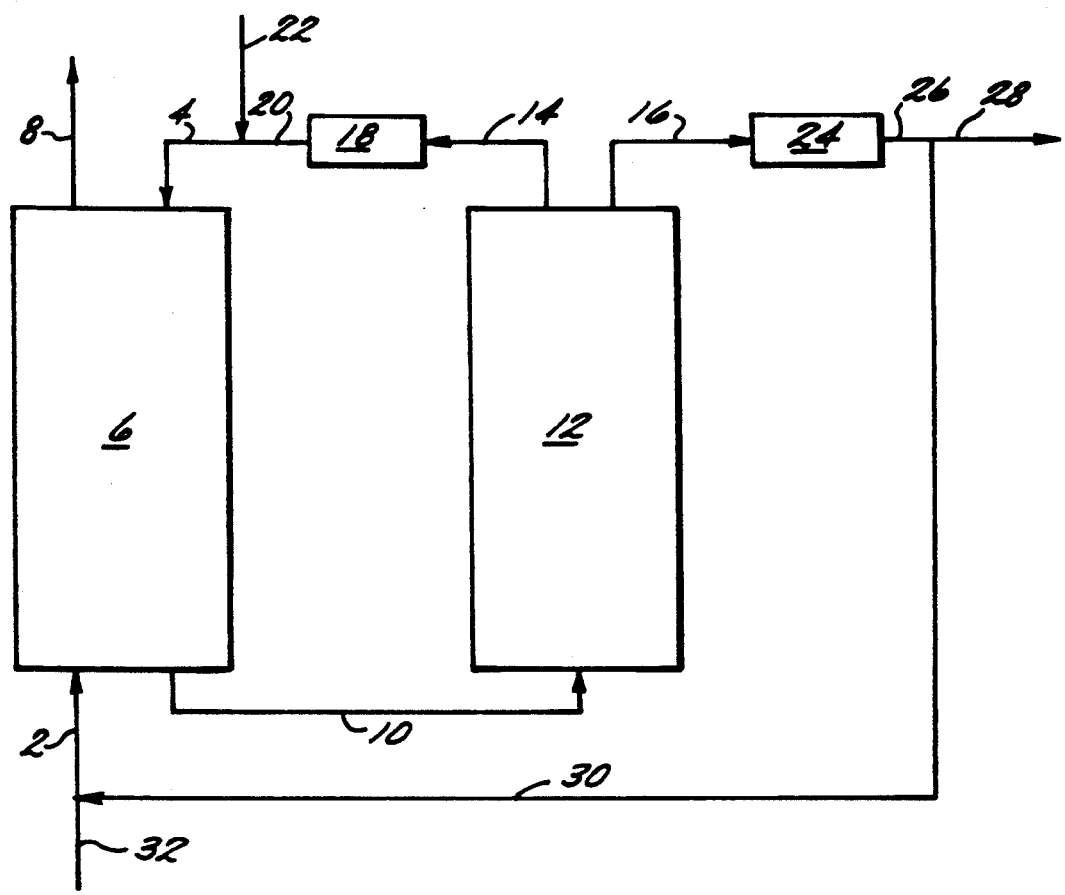
FIG. 1 shows a schematic diagram of a preferred embodiment of an apparatus of the present invention.

Referring to the schematic view of a preferred embodiment of the apparatus of the present invention shown in FIG. 1, a VOC contaminated gas stream 2 and an absorbent stream 4 are directed to an absorption apparatus 6 to allow absorption of the VOC from the gas stream into the absorbent. The term "absorption" is used herein to denote transfer of a soluble component from a gas phase mixture into a liquid absorbent wherein volatility of the liquid absorbent is low under the process conditions.

The source of gas stream 2 may be, e.g. off-gas produced by the above discussed air stripping or vapor extraction remediation processes, flue gases, off-gases from solvent degreasing operations or off-gases from other industrial processes. Typically, the contaminated gas stream 2 contains from about 10 parts per million by volume (ppmv) to about 10,000 ppmv of the VOC contaminant.

The terminology "volatile organic compound" or, equivalently, "VOC", is used herein to denote any organic compound having a boiling point (b.p.)≦170° C. and/or a vapor pressure (v.p.)≧1 mm Hg at 25°C. Specific examples of VOC's include: hexane, styrene, benzene, chlorobenzene, ethylbyenzene, toluene, o-zylene, m-zylene, p-zylene, carbon tetrachloride, methylene chloride, trichloromethane, 1, 2 dibromoethane, vinyl chloride, 1, 1 dichloroethene, cis -1, 2 dichloroethene, trans - 1, 2 dichloroethene, 1, 1, 1 trichloroethane, trichloroethene, 1,1, 2, 2 tetrachloroethane, tetrachloroethene (also known as perchloroethene), 1, 2 dichloropropene and mixtures thereof. Those skilled in the art will recognize the above list of examples is not exhaustive.

The group of liquid absorbents found to be useful in the practice of the present process is a significant feature of the present invention. The terms "absorbent" and "organic solvent" are used interchangeably herein to denote a substantially nonvolatile organic liquid in which the VOC contaminant sought to be removed from the gas stream is soluble. Suitable absorbents for practice of the process of the present invention include, e.g. petroleum derivatives, vegetable oils and synthetic oils. Specific examples of suitable absorbents include motor oil, vegetable oil, corn oil, mineral oil, olive oil, castor oil, coconut oil, palm oil, peanut oil, safflower oil, soya bean oil, tucum oil, linseed oil, cotton seed oil and mixtures thereof. Motor oil, mineral oil, corn oil are preferred liquid absorbents due to their respective high capacities for VOC's, as demonstrated in Example 5 set forth below. Corn oil is particularly preferred as the liquid absorbent of the present invention.

As demonstrated by the equilibrium data presented in Examples 1–6 below, the solubility of particular VOCs in the particular absorbents of the present invention is high. Preferably, the absorbent used in the removal of a particular VOC is chosen so that the particular VOC sought to be removed from the gas stream has a very high solubility in the absorbent to provide a correspondingly very high driving force for mass transfer of the VOC from the gas stream into the absorbent.

Design of suitable process equipment for the gas-liquid contacting step of the present invention is based on known engineering principles. Absorption apparatus 6 may comprise e.g. a packed column, a tray column, a wetted-wall or falling film column, a bubble column, a spray chamber, a membrane system or an agitated vessel. The liquid and gas streams may be contacted in a batch process, e.g. in an agitated vessel, or in a continuous process, e.g. in a packed column. An apparatus for continuous processing may be operated in a counter-current, a co-current or a cross flow mode. The liquid phase, the gas phase, or both the liquid and gas phases may be continuous phases.

The step of contacting the contaminated gas stream with the absorbent is carried out under conditions which allow absorption of the VOC contaminant from the gas stream into the absorbent. Preferably, the contacting step is carried out under conditions which allow saturation of the absorbent with the VOC contaminant being removed from the gas stream.

The effect of temperature and pressure on the partitioning of several particular VOC contaminants from the gas stream into a liquid absorbent is demonstrated in Examples 2–4 below, i.e. the solubility of VOC's in the liquid absorbents of the present invention increase with increasing pressure and decreases with increasing temperature. In general, the absorption apparatus 6 should be operated at the highest possible pressure and lowest possible temperature consistent with economic considerations and other process requirements to thereby provide the highest effective solubility of the VOC contaminant in the absorbent. Preferably, the contacting step of the present invention comprises contacting a gas stream with the absorbent at a pressure between about 1 atm and about 3 atms and a temperature between about 5° C. and about 35° C.

Referring again to FIG. 1, an effluent reduced-contaminant gas stream 8 is directed from the absorption apparatus 6 and, e.g. discharged to the atmosphere. A VOC-laden absorbent stream 10 is directed from the absorption apparatus 6 to a separation apparatus 12.

The marked difference in volatility between the substantially nonvolatile absorbent of the present invention and the highly volatile contaminant absorbed in the absorbent provides a convenient basis for separating the contaminant from the absorbent and the design of suitable process equipment for separation of the VOC contaminant from the absorbent is based on known engineering principles. The separation of VOCs from liquid absorbents of the present invention under mild processing conditions is demonstrated in Examples 7 and 8 below. Separation apparatus 12 may comprise, e.g. a distillation column, a stripping column, an evaporator, a membrane stripping device, or other desorption device. The terms "stripping" and "desorption" are used herein to denote transfer of a dissolved gas from a liquid into a gas stream. The term "evaporation" is used herein to denote removal of a dissolved volatile component by vaporization of the component from a nonvolatile solvent. Preferably, the VOC contaminant is separated from the VOC contaminant laden absorbent liquid by vacuum distillation or evaporation. Most preferably, the absorbed VOC contaminant is separated from the absorbent by heating the contaminated absorbent at a temperature from about 25° C. to about 200° C. at a pressure from about 0.15 atm up to about 1 atm to evaporate the VOC contaminant.

Referring again to FIG. 1, an absorbent recycle stream 14 and a concentrated VOC stream 16 are directed from the separation apparatus 12. The absorbent recycle stream 14 is cooled in a condenser 18 to form a cooled absorbent recycle stream 20 which, combined with optional absorbent makeup stream 22, forms influent absorbent stream 4.

The concentrated VOC stream 16 is cooled in a condenser 24 to form a concentrated VOC stream 26. A condensed VOC product stream portion 28 is discharged. Optionally, a noncondensed VOC product stream portion 30 may be directed from condenser 24 and combined with off-gas stream 32 to form influent gas stream 2.

The condensed VOC product stream 28 produced by the apparatus of the present invention is a reclaimed resource, i.e. the VOC product can be reused rather than being dumped in a landfill, discharged to the atmosphere or being otherwise "disposed" of. The VOC product stream 28 may require additional treatment prior to reuse, e.g. if the liquid VOC product stream 26 comprises a mixture of VOCs, the various components can be separated by fractional distillation.

Figure 2:
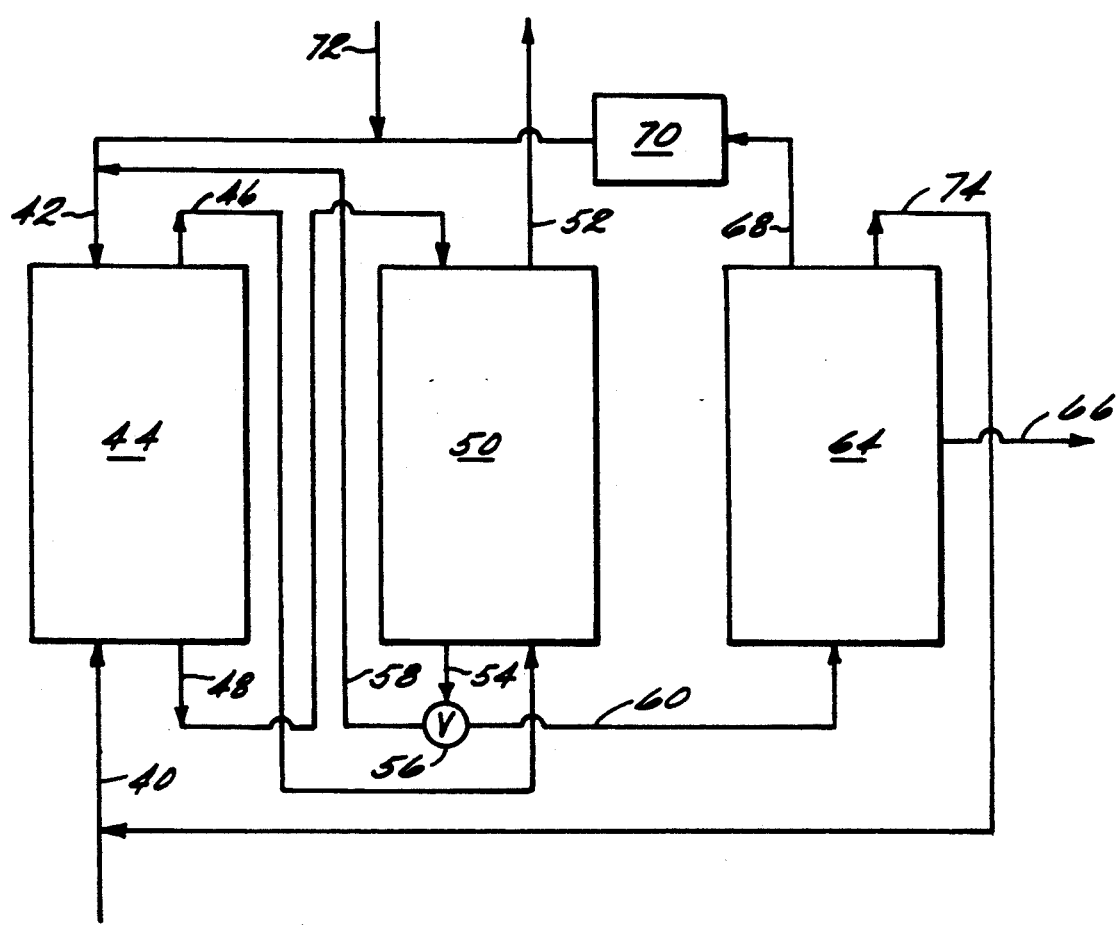
FIG. 2 shows an alternative embodiment of an apparatus of the present invention.

A second embodiment of the apparatus of the present invention including two absorption stages is shown in FIG. 2.

A VOC contaminated gas stream 40 and a stream of absorbent 42 are contacted a first absorption stage 44. A first VOC laden absorbent stream 46 and a first reduced contaminant gas stream 48 exit the first absorption stage 44 and are further contacted in second absorption stage 50. A second VOC laden absorbent stream 54 and a second reduced contaminant gas stream 52 exit the second absorber stage. Reduced-contaminant gas stream 52 may, e.g., be vented to the atmosphere. The second VOC laden absorbent stream may be split at valve 56 into an optional recycled VOC laden absorbent stream 58 and a VOC laden absorbent stream 60. The absorbed VOC contaminant is separated from the VOC laden absorbent stream 60 in separator 64. A recycled clean absorbent stream 68 exits the separator 64, is cooled in condensor 70 and may be combined with recycled VOC laden absorbent stream 58 to form influent absorbent stream 42. If necessary, make up absorbent stream 72 may be combined with recycled absorbent stream 68. If necessary, a contaminated off gas stream 74 may be directed from separator 64 and combined with influent gas stream 40. A concentrated VOC product stream 66 exits separator 64.

EXAMPLE 1

The partitioning of trichloroethane, trichloroethene, perchloroethene and benzene between a contaminated gas phase and an absorbent (corn oil) of the present invention at 1 atmospheric pressure and 25° C. was determined.

A sample volume of each VOC was injected into a respective sample volume of absorbent in a flask stoppered with a deformable diaphragm and allowed to equilibrate. Samples of the gas phase and of the liquid phase were removed from the equilibrated system and analyzed by gas chromatography to determine the composition of each phase. Results of the chromatographic analysis were checked by using the results to calculate a mass balance for the system.

Figure 3:
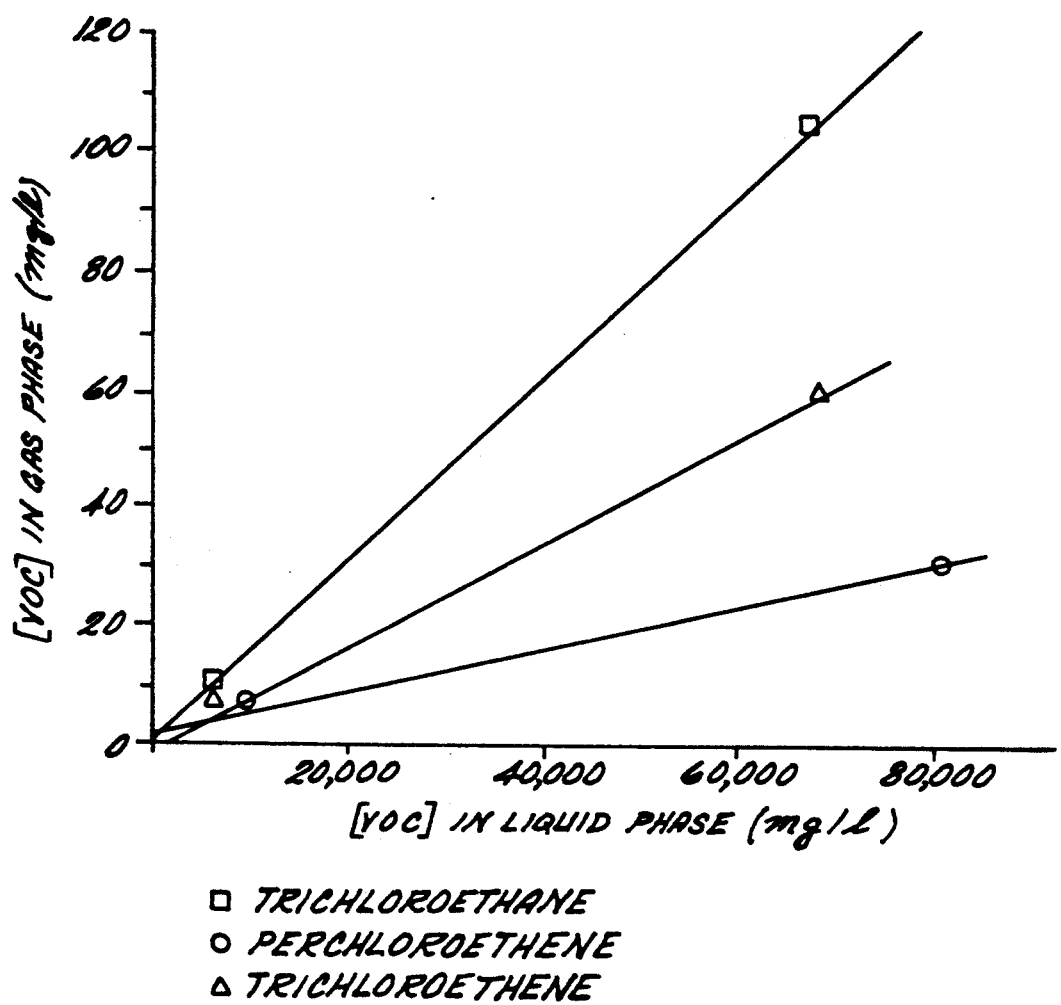
FIG. 3 is a plot of the concentration of a volatile organic compound in the gas phase versus the concentration of the volatile organic compound in a liquid absorbent (corn oil) for several systems at equilibrium at 25° C. and 1 atm pressure.
Figure 4:
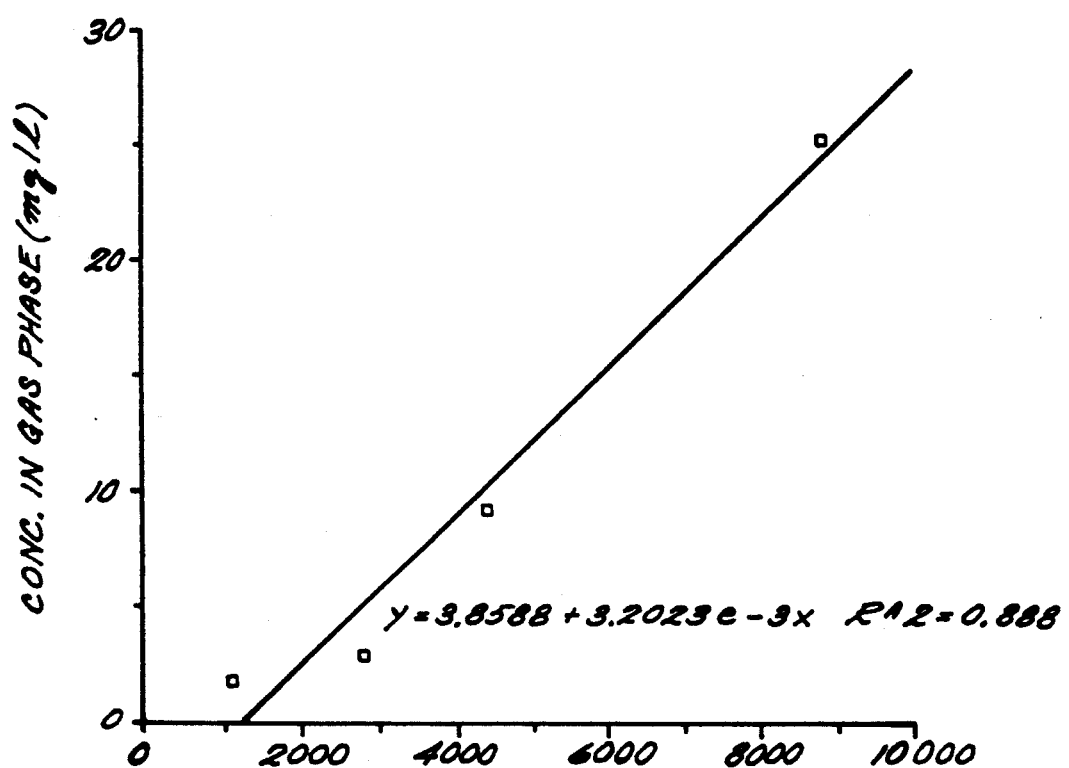
FIG. 4 is a plot of the concentration of benzene in the gas phase versus the concentration of benzene in a liquid absorbent (corn oil) for a system at equilibrium at 25° and 1 atm pressure.

Results are plotted in FIGS. 3 and 4 as concentration of the volatile organic compound ([VOC]) in the gas phase versus [VOC] in the liquid phase at equilibrium. As used herein, brackets denote "the concentration of" the bracketed compound, e.g. [VOC] means "the concentration of the volatile organic compound".

EXAMPLE 2

The relationship between pressure and the equilibrium constant k of methylene chloride (MeCl) in corn oil at 25° C. was determined.

The concentrations used in calculating the equilibrium constants were determined at each pressure according to the method set forth in EXAMPLE 1.

Figure 5:
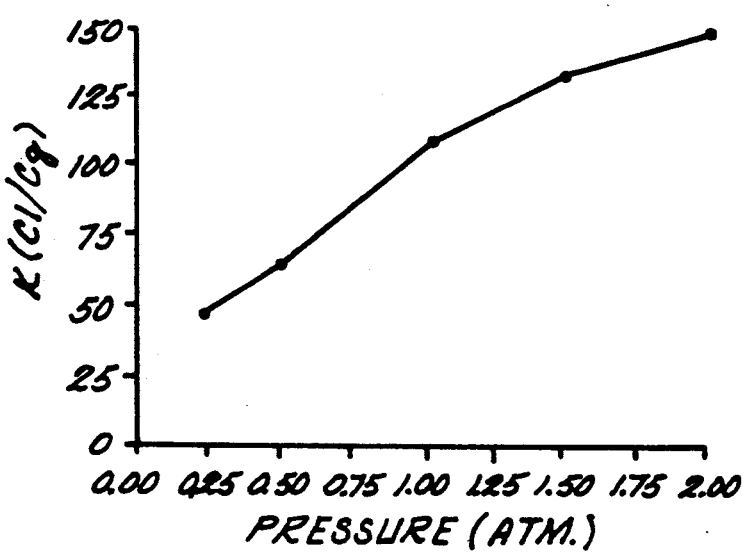
FIG. 5 is a plot of the equilibrium constant K for methylene chloride in corn oil versus pressure.

Results are plotted in FIG. 5 as equilibrium constant K (wherein K=[MeCl] in liquid phase / [MeCl] in gas phase) versus pressure.

EXAMPLE 3

The relationship between temperature and equilibrium constant of methylene chloride in corn oil was determined by the method set forth in EXAMPLE 1.

Figure 6:
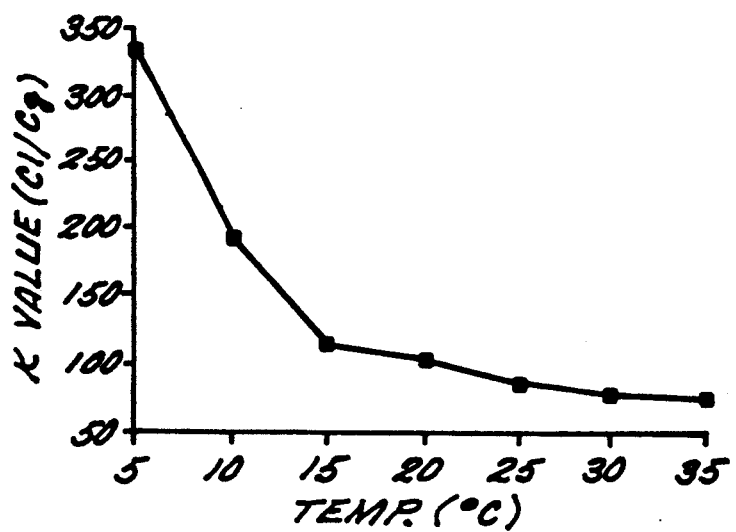
FIG. 6 is a plot of the equilibrium constant K for methylene chloride in corn oil versus temperature.

Results are plotted in FIG. 6 as equilibrium constant K (wherein K=[MeCl] in liquid phase / [MeCl] in gas phase) versus temperature.

EXAMPLE 4

The gas phase concentration of methylene chloride in equilibrium with a 20 ml sample of corn oil which initially included 90 ul of methylene chloride was determined at a pressure of one atmosphere by the method set forth in EXAMPLE 1 as a function of temperature.

Figure 7:
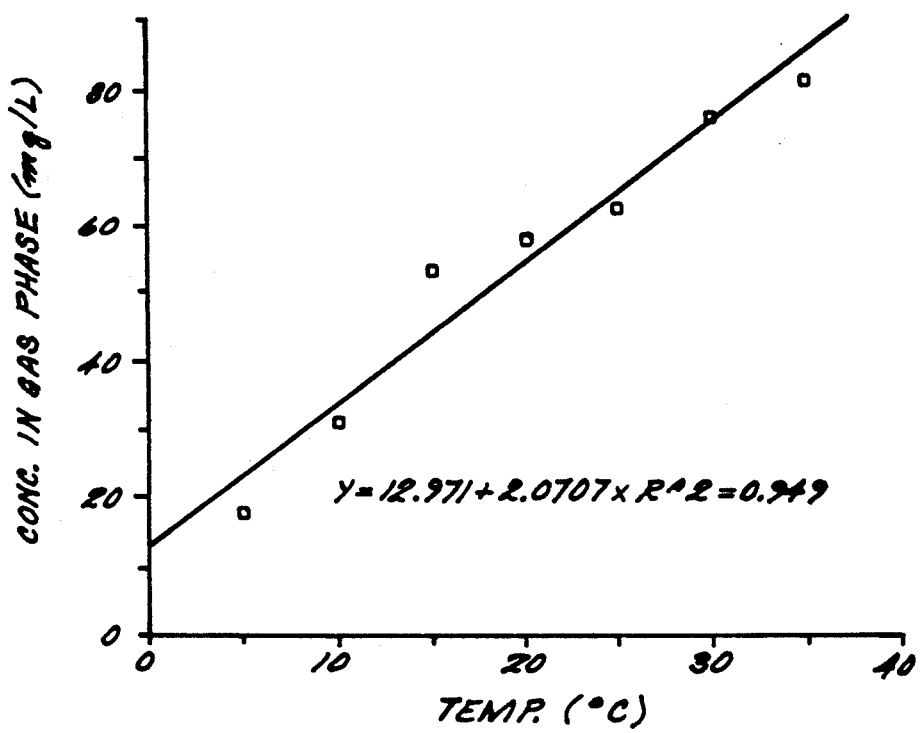
FIG. 7 is a plot of the concentration of methylene chloride in the gas phase for methylene chloride in corn oil versus temperature.

Results are plotted in FIG. 7 as [MeCl] in gas phase versus temperature.

EXAMPLE 5

The partitioning of methylene chloride between a contaminated gas phase and several liquid absorbents, i.e. corn oil, mineral oil and motor oil, was determined by the method set forth in EXAMPLE 1.

Figure 8:
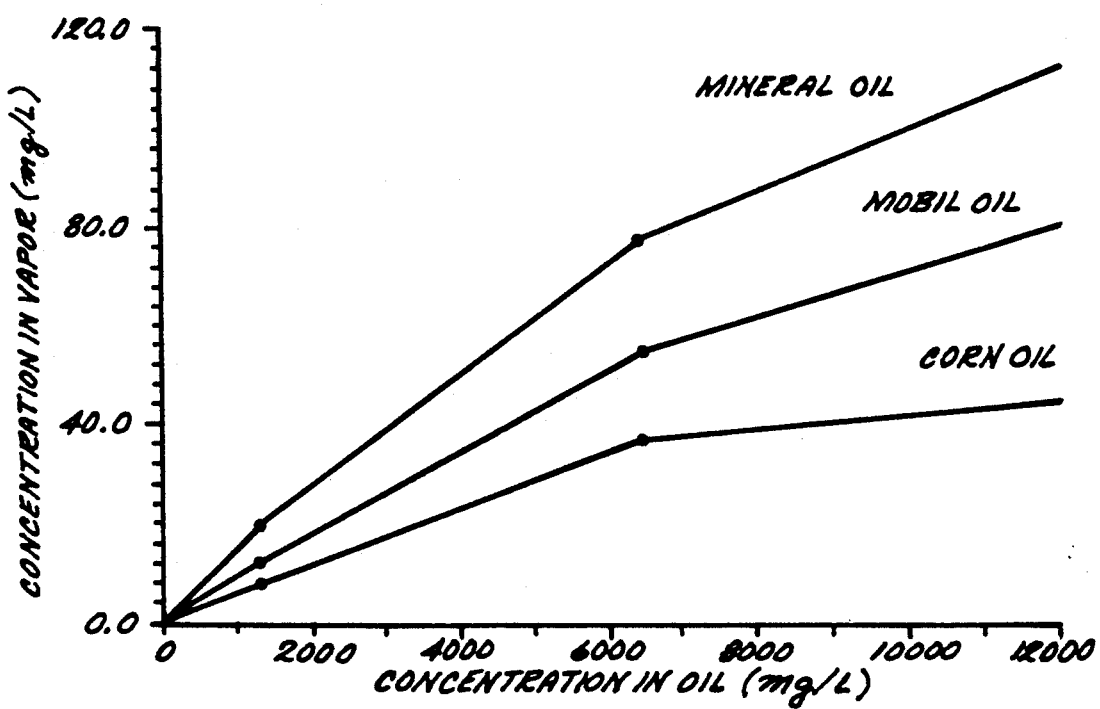
FIG. 8 is a plot of the concentration of methylene chloride in the gas phase versus the concentration of methylene chloride in liquid absorbent phase at equilibrium at 25° and 1 atm pressure for several liquid absorbents.

Results are plotted in FIG. 8 as [MeCl] in the gas phase versus [MeCl] in the liquid phase.

EXAMPLE 6

The relationship between the equilibrium constant (at 1 atm and 25° C.) of methylene chloride in several liquid absorbents and initial [MeCl] in the liquid phase was determined. The equilibrium constants were determined by the method set forth in EXAMPLE 2.

Figure 9:
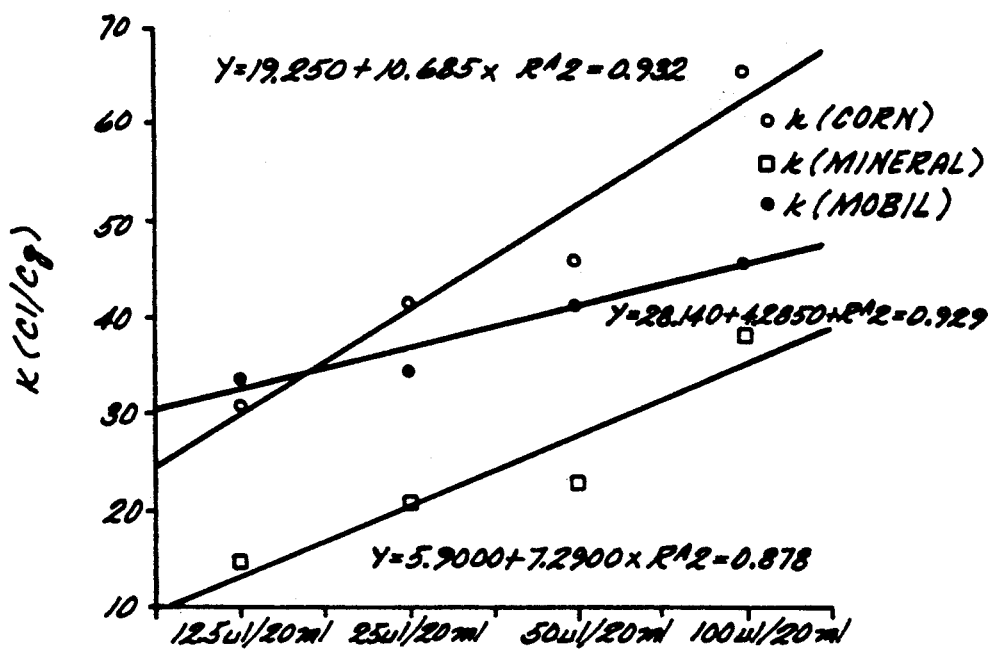
FIG. 9 is a plot of equilibrium constant K for a several methylene chloride/liquid absorbent systems versus the initial concentration of methylene chloride in the absorbent.

Results are plotted in FIG. 9 as equilibrium constant K (wherein K=[MeCl] in gas phase / [MeCl] in liquid phase) versus initial [MeCl] in the liquid phase.

EXAMPLE 7

An absorbed volatile organic compound, i.e. methylene chloride, was separated from an absorbent, i.e. corn oil, by evaporation at 50° C. and 0.5 atm. The concentration of methylene chloride was monitored as a function of time.

Figure 10:
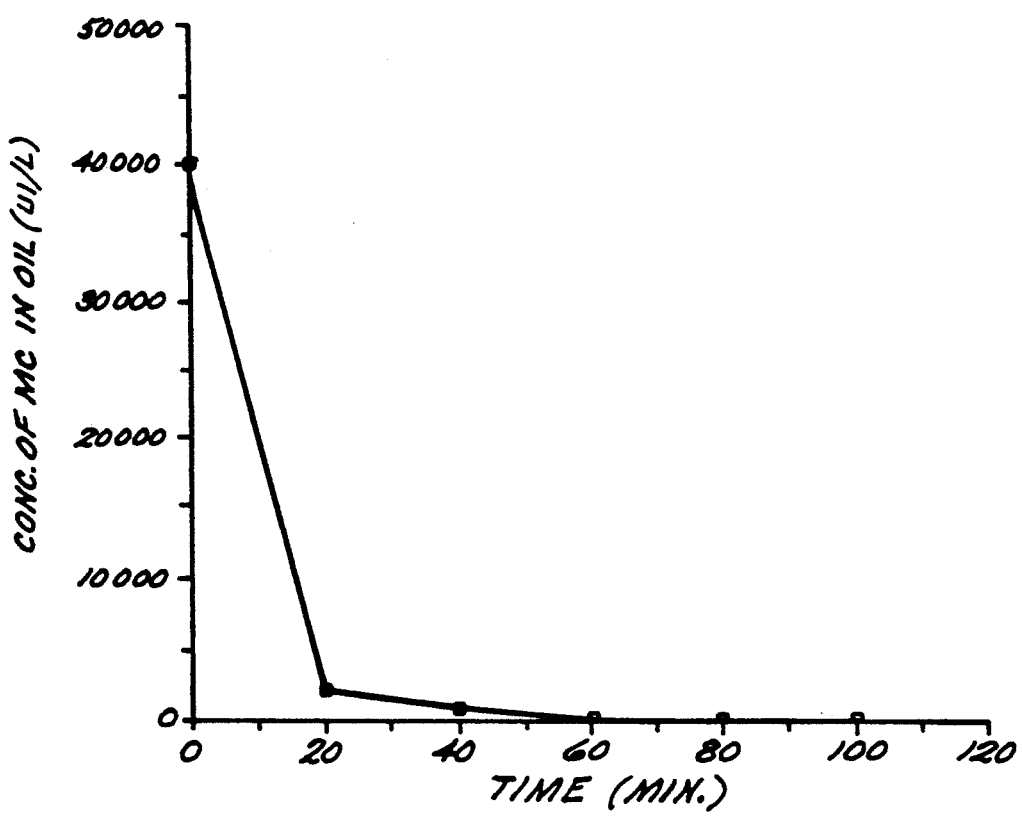
FIG. 10 is a plot of the concentration of methylene chloride in corn oil versus time at 50° and 0.5 atm.

Results are plotted in FIG. 10 as [MeCl] in the liquid phase versus time.

EXAMPLE 8

An absorbed volatile organic compound, i.e. perchloroethene (PCE), was separated from an absorbent, i.e. corn oil, by distillation. A sample (960 ml) of PCE contaminated (25 vol. % PCE) corn oil was distilled for 1.3 hours at 100° C. and 0.75 atm. The distillate was condensed at −5° C. and collected in a flask cooled in an ice bath. A sample of the condensate was injected into a sample of clean corn oil and then analyzed by gas chromatography to determine the composition of the condensate. About 93% of the PCE was recovered in the condensate.

The process and apparatus of the present invention provide an economical, efficient and environmentally benign technique for removing VOCs from a VOC contaminated gas stream and for reclaiming the removed VOCs. The process of the present invention may be used alone, e.g. to clean up off-gases from an industrial degreasing operation, or in series with other treatment processes, e.g. to clean up off-gases from a groundwater stripping process. Rather than simply transferring VOCs from one contaminated medium, e.g. groundwater, to contaminate another medium, e.g. the air, the process of the present invention allows reclaimation of VOCs and effective removal of the VOCs from the environment.

The favorable economics provided by high capacity of the absorbent of the present invention to solublize the VOC contaminants, the potential for rapid mass transfer between the gas stream and the absorbent, and the ability to reclaim individual VOCs from the absorbent makes the present invention a very attractive technology for both the prevention of VOC discharges and for the remediation of VOC contaminated sites.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A method for removing a volatile organic compound from a gas stream contaminated therewith, consisting essentially of:
    contacting a volatile organic compound contaminated gas stream with an organic solvent up to the point when the solvent becomes saturated with the volatile organic compound, said organic solvent consisting essentially of a nonvolatile organic liquid;
    controlling the temperature or pressure or both of the gas stream and organic solvent to maintain a temperature and pressure range effective to optimize or at least increase the solubility of the gas stream in the solvent;
    separating the volatile organic compound from the solvent;
    collecting the separated volatile organic compound; and
    recovering the separated solvent.

2. The method of claim 1, wherein the solvent is selected from the group consisting of motor oil, mineral oil and corn oil.

3. The method of claim 1, wherein the volatile organic compound is separated from the solvent by distillation.

4. The method of claim 1, wherein the volatile organic compound is separated from the solvent by a membrane separation technique.

5. The method of claim 1, wherein the volatile organic compound is separated from the solvent by steam stripping.

6. The method of claim 1, wherein the contaminated gas stream is contacted with the absorbent at a temperature between about 5° C. and about 35° C.

7. The method of claim 1, wherein the contaminated gas stream is contacted with the absorbent at a pressure between about 1 atm and 3 atm.

8. The method of claim 1 including the step of:
    delivering the recovered and separated solvent to said contaminated gas stream and repeating said contacting, separating, collecting and recovering steps.

9. The method of claim 1 wherein said separating step produces a reduced contaminated gas stream and including the step of:
    venting said reduced contaminated gas stream to the atmosphere.

10. An apparatus for removing a volatile organic compound from a contaminated gas stream, comprising:
    means for contacting the contaminated gas stream with an organic solvent to saturate the solvent with the volatile organic compound, said organic solvent consisting essentially of a nonvolatile organic liquid;
    means for controlling the temperature or pressure or both of the gas stream and organic solvent to maintain a temperature and pressure range effective to optimize or at least increase the solubility of the gas stream in the solvent;
    means for separating the volatile organic compound from the saturated solvent;
    means for collecting the separated volatile organic compound; and
    means for recovering the separated solvent.

11. The apparatus of claim 10, wherein the solvent is selected from the group consisting of motor oil, mineral oil and corn oil.

12. The apparatus of claim 10, including means for recycling the recovered solvent to the means for contacting.

13. The apparatus of claim 10 including:
    means for delivering the recovered and separated solvent to said means for contacting.

* * * * *

UNITED STATES PATENT AND TRADEMARK OFFICE
CERTIFICATE OF CORRECTION

PATENT NO. : 5,198,000
DATED : March 30, 1993
INVENTOR(S) : Domenic Grasso

It is certified that error appears in the above-identified patent and that said Letters Patent are hereby corrected as shown below:

Column 1, line 7, delete "Grosso" and insert therefor --Grasso--
Column 1, line 25, after "water", insert a period --.--
Column 1, line 49, delete "Process" and insert therefor --process--
Column 1, lines 58 and 59, after "infeasible", insert a period --.--
Column 3, line 45, delete "ethylbyenzene" and insert therefor --ethylbenzene--

Signed and Sealed this

Tenth Day of April, 2001

Attest:

NICHOLAS P. GODICI

Attesting Officer *Acting Director of the United States Patent and Trademark Office*